United States Patent [19]

Bauer

[11] 4,383,509

[45] May 17, 1983

[54] PISTON FOR INTERNAL COMBUSTION ENGINES

[75] Inventor: Friedrich Bauer, Mittelhembach, Fed. Rep. of Germany

[73] Assignee: M.A.N. Maschinenfabrik Augsburg-Nürnberg Aktiengesellschaft, Nuremberg, Fed. Rep. of Germany

[21] Appl. No.: 319,888

[22] Filed: Nov. 10, 1981

Related U.S. Application Data

[63] Continuation of Ser. No. 52,909, Jun. 28, 1979, abandoned.

[30] Foreign Application Priority Data

Jun. 30, 1978 [DE] Fed. Rep. of Germany ....... 2828749

[51] Int. Cl.$^3$ ............................................. F01P 3/10
[52] U.S. Cl. .................................. 123/193 P; 92/158
[58] Field of Search ........... 123/193 P, 197 A, 193 H, 123/193 R, 196 M; 92/158, 159

[56] References Cited

U.S. PATENT DOCUMENTS

| 1,492,397 | 4/1924 | Roberts | 92/158 |
| 3,187,643 | 6/1965 | Pope | 123/193 P |
| 3,251,349 | 5/1966 | Isley | 123/193 P |
| 4,008,051 | 2/1977 | Cadle | 123/193 P |

FOREIGN PATENT DOCUMENTS

| 2533746 | 3/1977 | Fed. Rep. of Germany | 123/193 P |
| 2304775 | 3/1976 | France | 123/193 P |

Primary Examiner—Charles J. Myhre
Assistant Examiner—Carl Stuart Miller
Attorney, Agent, or Firm—Becker & Becker, Inc.

[57] ABSTRACT

A piston for internal combustion engines, especially for high-performance internal combustion engines. The piston has several ring grooves for piston rings, and an oil control groove which is provided below the top ring groove, is separated therefrom, and opens only towards the cylinder bore. The land between the topmost ring groove and the oil control groove, seen in cross section, is designed as a support having constant bending stress and has a finite height at its outer surface. The inner confine of the oil control groove has a finite radius or rounded-off section to avoid an increased stress concentration factor.

4 Claims, 2 Drawing Figures

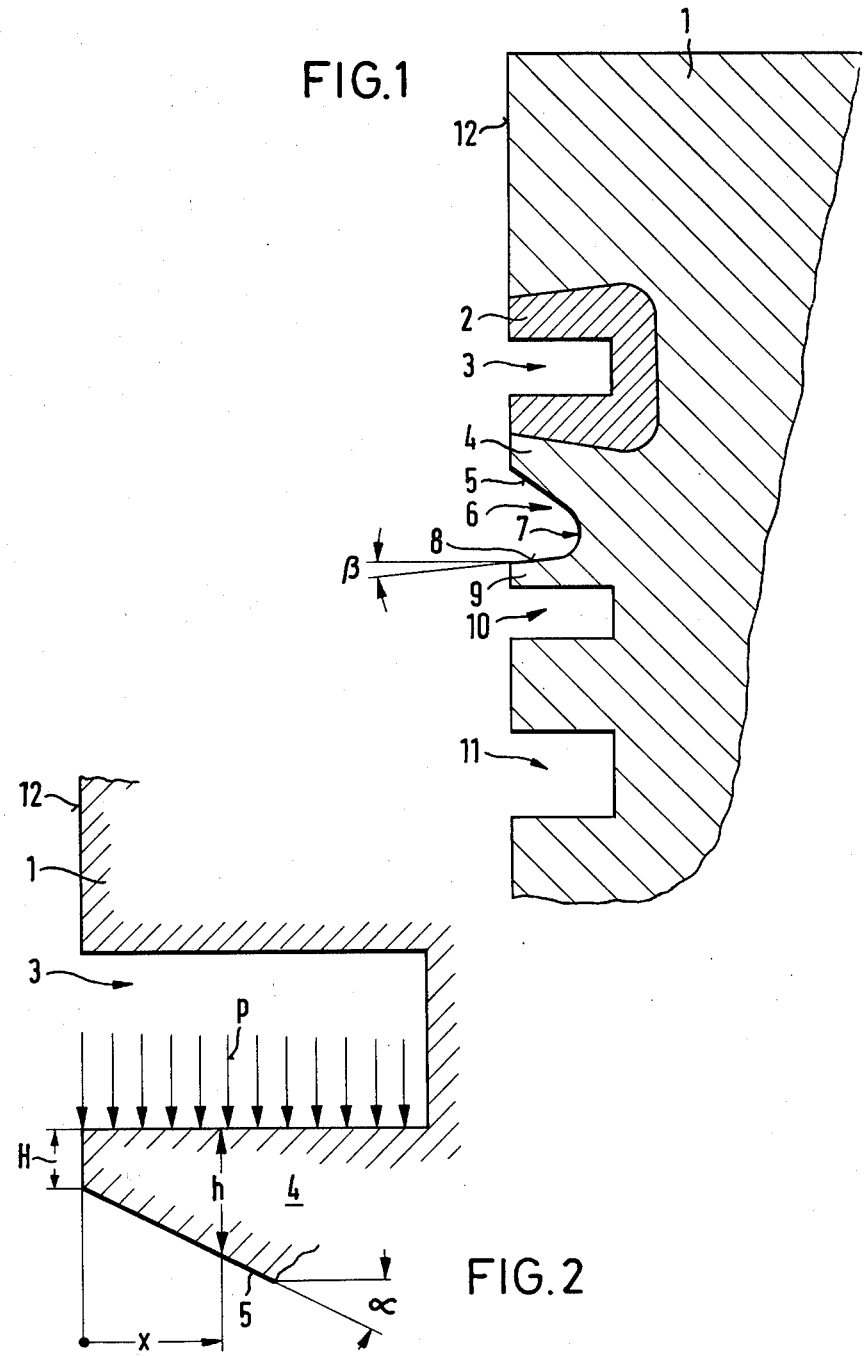

PISTON FOR INTERNAL COMBUSTION ENGINES

This is a straight continuation of application Ser. No. 52,909—Bauer filed June 28, 1979, now abandoned.

The present invention relates to a piston for internal combustion engines, especially for high-performance internal combustion engines, having several ring grooves for piston rings, and an oil control groove which is provided below the top ring groove, is separated from the latter, and opens only towards the bore or working surface of the cylinder.

A piston of this type is known. In that piston, an oil control groove was used for the first time to prevent deposits of carbon forming on the top land of the piston, in the ring groove next to the combustion chamber, and also below this ring groove. This configuration has given quite satisfactory results in practice, provided the oil control groove had a sufficiently large cross-sectional area. Its effect is most pronounced on the ring groove nearest the combustion chamber, because this constitutes one of the most highly stressed areas of the piston, since it is exposed directly to the temperatures prevailing in the cylinder and, via the piston ring, to almost the full combustion pressure.

For reasons of strength, and taking into consideration the mechanical and thermal deformations of the piston, it is necessary, especially in the case of pistons of low depths, where the ring-carrying portion cannot readily be increased at the expense of the barrel depth, to keep the depth of the oil control groove, and consequently its cross-sectional area, relatively small, with the result that frequently complete effectiveness is not assured.

It is an object of the present invention to improve a piston of the aforementioned type in such a way as to permit the cross-sectional area of the oil control groove to be sized sufficiently large to enable it to fulfill its purpose without extending the ring-carrying portion of the piston and with the same strength of the component.

This object, and other objects and advantages of the present invention, will appear more clearly from the following specification in connection with the accompanying drawing, in which:

FIG. 1 is a longitudinal section through the upper portion of a piston according to the present invention; and FIG. 2 shows the topmost ring groove of a piston with the land below, in section, intended as an example for a calculation.

The piston of the present invention is characterized primarily in that the land between the topmost ring groove and the oil control groove—seen in cross section—is designed as a support having constant bending stress, in that deviating from this concept, it is formed with a finite height at its outer surface to suit production, and in that the inner confine of the oil control groove is formed with a finite radius to avoid an increased stress concentration factor.

This affords optimum utilization of the piston body between the topmost ring groove and the one below it, and at the same time enables the oil control groove to be formed with a greater depth, so that the objective is fully achieved. An important aspect of the concept according to the invention is the fact that certain concessions have to be made to production which have to be carefully weighed. For instance, the land remaining between the topmost ring groove and the oil control groove has a finite height although, according to the well-known formula for supports of constant bending stress, it should taper to a point.

As a further development of the invention, it is proposed that—seen in cross section—the lower flank of the oil control groove is formed as a slightly sloping surface towards the outer surface of the piston to increase the cross-sectional area of the oil control groove, and is arranged in such a way that the land lying below the oil control groove is sufficiently sized strength-wise. The sloping surface is intended to improve the oil-collecting effect, to improve machining, and to facilitate production.

In the case of a piston in which the topmost ring groove is arranged in an embedded ring holder, it is finally proposed that in selecting the finite height of the land between the topmost ring groove and the oil control groove, the fatigue strength of the Alfin layer between the two different materials be taken into account. This will mainly involve the fatigue strength of the Alfin layer between a Niresist ring support and the aluminum alloy used for the piston.

Thus, seen in cross section, with the oil control groove according to the present invention, the upper confining surface and the lower flank together form a truncated wedge, with the angle of inclination of the upper confining surface corresponding approximately to 2.5 times the angle of inclination of the lower flank.

Referring now to the drawing in detail, FIG. 1 illustrates a piston 1 (shown only partially), in which is cast or embedded a ring insert or holder 2, in which is located a ring groove 3 which is nearest the combustion chamber. Below the ring holder 2, a ridge or land 4, which, seen in cross section, is profiled as a support of contant bending resilience or stress, forms the upper confining surface 5 of an oil control or collection groove 6, which is further defined by a radius or rounded-off section 7, and a lower flank 8 which extends obliquely at an angle $\beta$. Below the oil control groove 6, the piston 1 is provided with a further ring groove 10, which is separated from the groove 6 by a land 9, and, finally with another groove 11 for an oil control or scraper ring. The outer surface 12 of the piston 1 coincides with the ground piston contour.

FIG. 2 shows the topmost ring groove 3 and the land 4 below it with the upper confining surface 5 of the oil control groove 6 extending at an angle $\alpha$. The land 4 has a finite height H selected to suit production. The force p acting on the land 4 due to the topmost piston ring (which is not illustrated) is assumed as a uniformly distributed load and is indicated by arrows. It is acceptable to consider the configuration as a plane model as long as the depth of the groove is considerably smaller than the piston diameter. The bending moment $M_b$, measured at a distance x from the outer surface 12 of the piston 1, is obtained from the well-known formula $m_b = p \cdot x + x/2 = p \cdot x^2/2$.

The allowable bending stress $\sigma_b$ is calculated from $\sigma_b = M_b/W_b$, where $M_b$ denotes the moment of resistance and, in the case of a rectangle, $W_b = h_2/6$, h being the respective thickness of the land 4 at a given distance x.

Consequently, the respective thickness h of the land 4 can be determined as follows, if a maximum size oil control groove is desired:

$$h(x) = x \cdot \sqrt{\frac{3 \cdot p}{\sigma b}} \text{ or tang } \alpha = \frac{dh}{dx} = \sqrt{\frac{3 \cdot p}{\sigma b}}.$$

The present invention is, of course, in no way restricted to the specific disclosure of the specification and drawings, but also encompasses any modifications within the scope of the appended claims.

What I claim is:

1. A piston for use in a cylinder of a high-performance internal combustion engine, the piston having a relatively short axial length, the piston comprising in combination:
   a top surface;
   an outer cylindrical surface juxtaposed with the wall of the cylinder;
   a top ring groove in the outer surface of the piston adjacent the top surface of the piston for receiving a top piston ring;
   an oil accumulating groove positioned beneath the top ring groove for dispensing oil in front of the top piston ring as the ring moves downwardly, the oil accumulating groove being annular with respect to the longitudinal axis of the piston and having an upwardly inclined upper oil-confining surface and a downwardly inclined lower oil-confining surface, the angle of the top oil-confining surface with respect to an imaginary plane normal to the axis of the piston being purposely different in angle of inclination by approximately 2.5 times the angle of the bottom oil-confining surface with the imaginary plane whereby an intentionally increased amount of oil is dispensed to lubricate the piston ring in the top ring groove;
   a portion of the outer cylindrical surface of the cylindrical wall separating the opening of the top ring groove from the opening of the oil-accumulating groove; and
   at least one additional ring groove positioned below the oil-accumulating groove for receiving and carrying at least one more piston ring.

2. A piston in combination according to claim 1 wherein the upper and lower oil-confining surfaces are joined by a smooth curve which forms the bottom of the groove.

3. A piston in combination according to claim 2 wherein the depth of the oil-accumulating groove is less than the depth of the ring grooves.

4. A piston in combination according to claim 1 wherein a grooved insert made of a material harder than the material of the piston is placed in the top ring groove to form a surface upon which the piston ring bears.

* * * * *